United States Patent [19]

Emmer

[11] Patent Number: 5,322,651
[45] Date of Patent: Jun. 21, 1994

[54] METHOD AND APPARATUS FOR THE THERMAL TREATMENT OF THERMOPLASTIC PREFORMS

[75] Inventor: Gerard Emmer, Saint Jouin Bruneval, France

[73] Assignee: Sidel, Le Havre, France

[21] Appl. No.: 41,975

[22] Filed: Apr. 2, 1993

[30] Foreign Application Priority Data

Apr. 3, 1992 [FR] France .................................. 92 04274

[51] Int. Cl.⁵ .............................................. B29C 35/08
[52] U.S. Cl. ........................................ 264/25; 264/37; 264/40.6; 264/535; 425/526; 425/174.4; 432/10; 432/21; 432/42
[58] Field of Search ................. 264/25, 37, 40.1, 40.6, 264/535, 521; 425/174.4, 144, 526; 432/10, 11, 21, 24, 42

[56] References Cited

U.S. PATENT DOCUMENTS

| | | | |
|---|---|---|---|
| 4,050,887 | 9/1977 | Berggren et al. | 264/520 |
| 4,076,071 | 2/1978 | Rosenkranz et al. | 264/25 |
| 4,079,104 | 3/1978 | Dickson et al. | 425/526 |
| 4,117,050 | 9/1978 | Appel et al. | 264/520 |
| 4,234,297 | 11/1980 | Kontz | 425/174.4 |
| 4,300,880 | 11/1981 | Suzuki | 432/138 |
| 4,606,723 | 8/1986 | Pasternicki | 425/526 |
| 5,066,222 | 11/1991 | Roos et al. | 432/10 |

FOREIGN PATENT DOCUMENTS

| | | |
|---|---|---|
| 3101282 | 9/1982 | Fed. Rep. of Germany . |
| 2015920 | 9/1979 | United Kingdom . |
| 2156732 | 3/1985 | United Kingdom . |

Primary Examiner—Catherine Timm
Attorney, Agent, or Firm—Sughrue, Mion, Zinn, Macpeak & Seas

[57] ABSTRACT

Preforms are thermally treated in a continuous-run oven equipped with infrared lamps. The portions of the oven exposed to infrared radiation are cooled by an air flow, whose temperature is kept constant by mixing air at ambient temperature with hot air. The latter is obtained by recycling at least part of the cooling air flow, which becomes heated as it carries away excess heat. A recycling mechanism in the form of a plenum box 13 equipped with a pivotable shutter 16 for adjusting the proportions of recycled hot air and ambient temperature air makes it possible to keep the temperature of the cooling air constant.

4 Claims, 2 Drawing Sheets

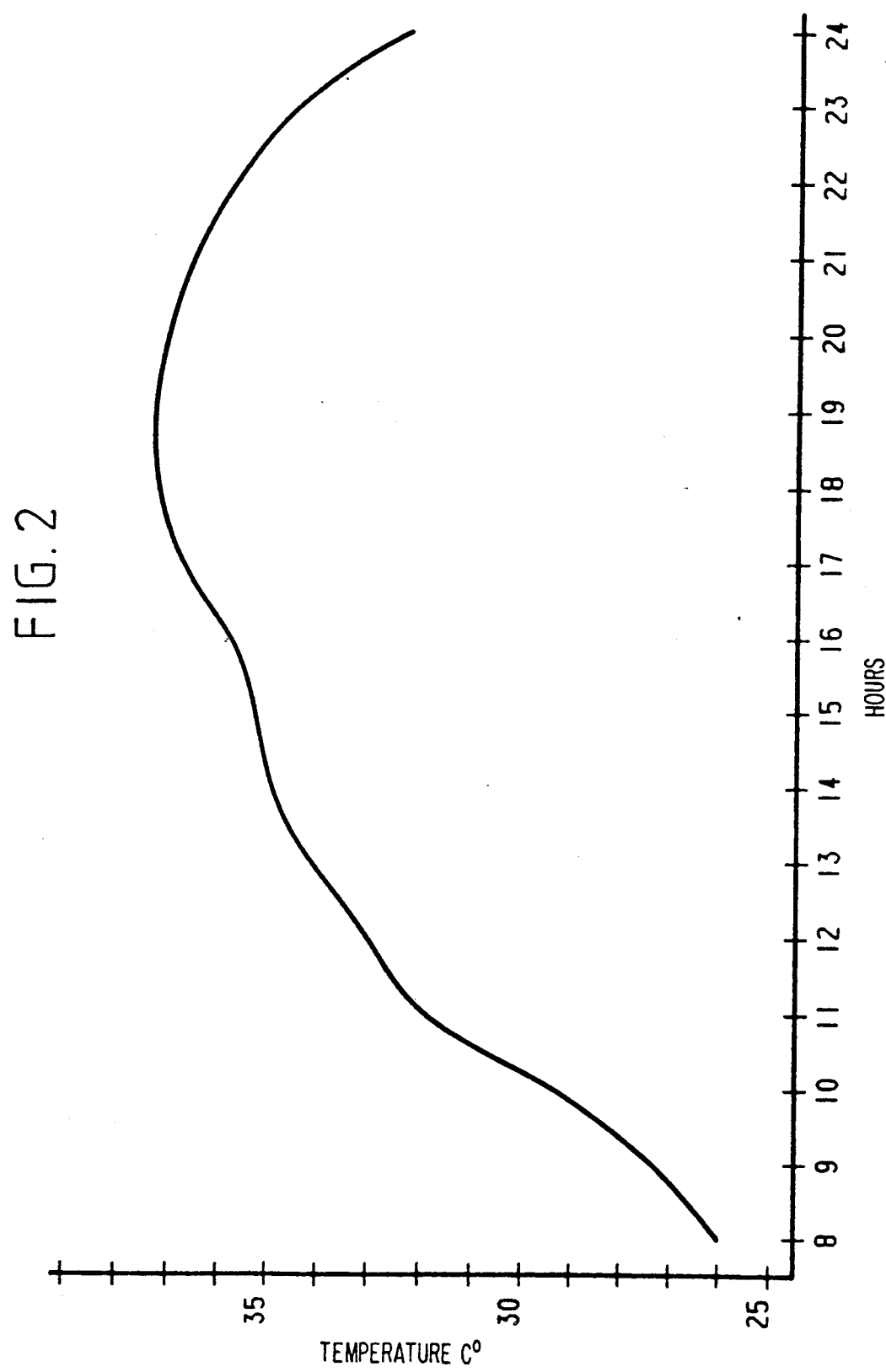

METHOD AND APPARATUS FOR THE THERMAL TREATMENT OF THERMOPLASTIC PREFORMS

BACKGROUND OF THE INVENTION

This invention concerns, in general, ovens which heat by infrared radiation, and, more specifically, ovens designed to heat preforms made of thermoplastic materials for the manufacture of hollow bodies such as bottles, flasks, or similar objects by blow molding or stretch blow molding.

Conventional machines used to manufacture these hollow bodies by blow molding or stretch blow molding; incorporate at least a preform thermal treatment station, in which the preforms are heated to a temperature such that they can then be molded in a blow molding or stretch blow molding; operation and a station for blowing the preforms in molds whose impressions have the shape of the hollow bodies to be produced. Respective conveyors provide for the feed of the preforms to the thermal treatment station and the transfer of the heated preforms between the treatment station and the blowing station.

Heating by infrared radiation is conventionally known and widely used in the industry for the thermal treatment of plastic preforms, in particular those made of polyethylene terephthalate (PET), the preforms being designed for the manufacture of hollow bodies such as bottles. In comparison with other heating or thermal treatment methods such as convection and conduction, and considering the low level of thermal conductivity of the material, heating using infrared radiation gives advantageous output and allows increased production rates.

Given the high energy density given off in these ovens, it is necessary to cool the parts of the oven most exposed to infrared radiation, in particular the stationary parts, in order not to damage them. To this end, a flow of cooling air which carries away excess calories has become necessary. In conventional installations, air is collected in the premises on which the oven is installed, using one or more fans. Once thermal exchange has been achieved, this air is evacuated within the premises at the top part of the oven.

The search for ever-increasing rates of production, the blowing of bottles or containers having increasingly complex shapes, and reducing the weight of the preforms while preserving, and indeed enhancing, the technical performance of the finished articles, require a distribution of material in the final product which is both precise and accurately repeated during the entire production run. These requirements make it necessary to control completely the thermal treatment of the preforms, thereby requiring precise adjustments regulating the heating profile. A very high degree of precision is thus made mandatory, not only in the installation of the infrared emitting sources and the associated intensity controls, but also in the temperature stability of the air flow circulating through the oven.

Tests have demonstrated the harmful effect of any temperature variation of this air flow, in particular on thickness distribution and, more generally, on the quality of the final article. This air, which is drawn from the shop where the machine is installed, such shop not normally being equipped with an expensive airconditioning unit, undergoes temperature changes from summer to winter, from day to day, and as a function of parameters such as the opening of a door, for example.

In fact, it appears that, during the course of one day, temperature variations may be significant. Since the regulation circuit adjusting the thermal preform processing is controlled by an infrared pyrometer which measures the temperature of the outer walls of the preforms, any temperature variation of the flow of cooling air will affect the temperature of outer preform walls. The relationship obtaining between the quantity of heat stored in the preforms and the reading of the infrared pyrometer will then be distorted. As a result, the regulation of the thermal treatment is disrupted and the exact adjustments of the preform heating profiles are no longer correct, thereby leading to the manufacture of hollow bodies of disparate quality.

SUMMARY OF THE INVENTION

A purpose of this invention is thus to overcome the difficulties mentioned above, and to provide a method and an apparatus which allow the industrial production of hollow bodies made of thermoplastic materials exhibiting uniform quality, despite variations in the ambient temperature prevailing in the production shop.

To this end, the invention provides a method for thermal treatment of preforms made of thermoplastic materials, in particular PET, intended for the manufacture of hollow bodies, such as bottles, flasks, or similar objects, by blow molding or stretch blow molding; in which the preforms rotating on themselves (about their axes) are heated as they travel in front of elements which heat by infrared radiation, a flow of cooling air being used to carry away the excess heat generated by the infrared radiation. The temperature of the flow of cooling air is kept constant and equal to a temperature Tc by mixing air at ambient temperature and hot air, the latter being obtained by recycling at least a part of the flow of cooling air which has become heated by drawing away the excess heat.

The invention also provides an apparatus for the thermal treatment of preforms made of PET designed for the manufacture of hollow bodies such as bottles, flasks, or similar objects, by blow molding or stretch blow molding; blowing or blowing-stretching, comprising rotating preform supports which travel in front of elements which heat by infrared radiation, insulation panels positioned behind these heating elements, reflectors positioned opposite the heating elements, preform-neck protectors, and at least one fan which generates a flow of cooling air used to evacuate the excess heat generated by the infrared radiation, while it cools the components of the apparatus. Means are included for recycling the flow of cooling air which has become heated by evacuating the excess heat.

BRIEF DESCRIPTION OF THE DRAWINGS

FIG. 2 is an example of an ambient temperature curve, as a function of time, for a typical container-production shop.

DETAILED DESCRIPTION OF THE PREFERRED EMBODIMENT

Figure 1:
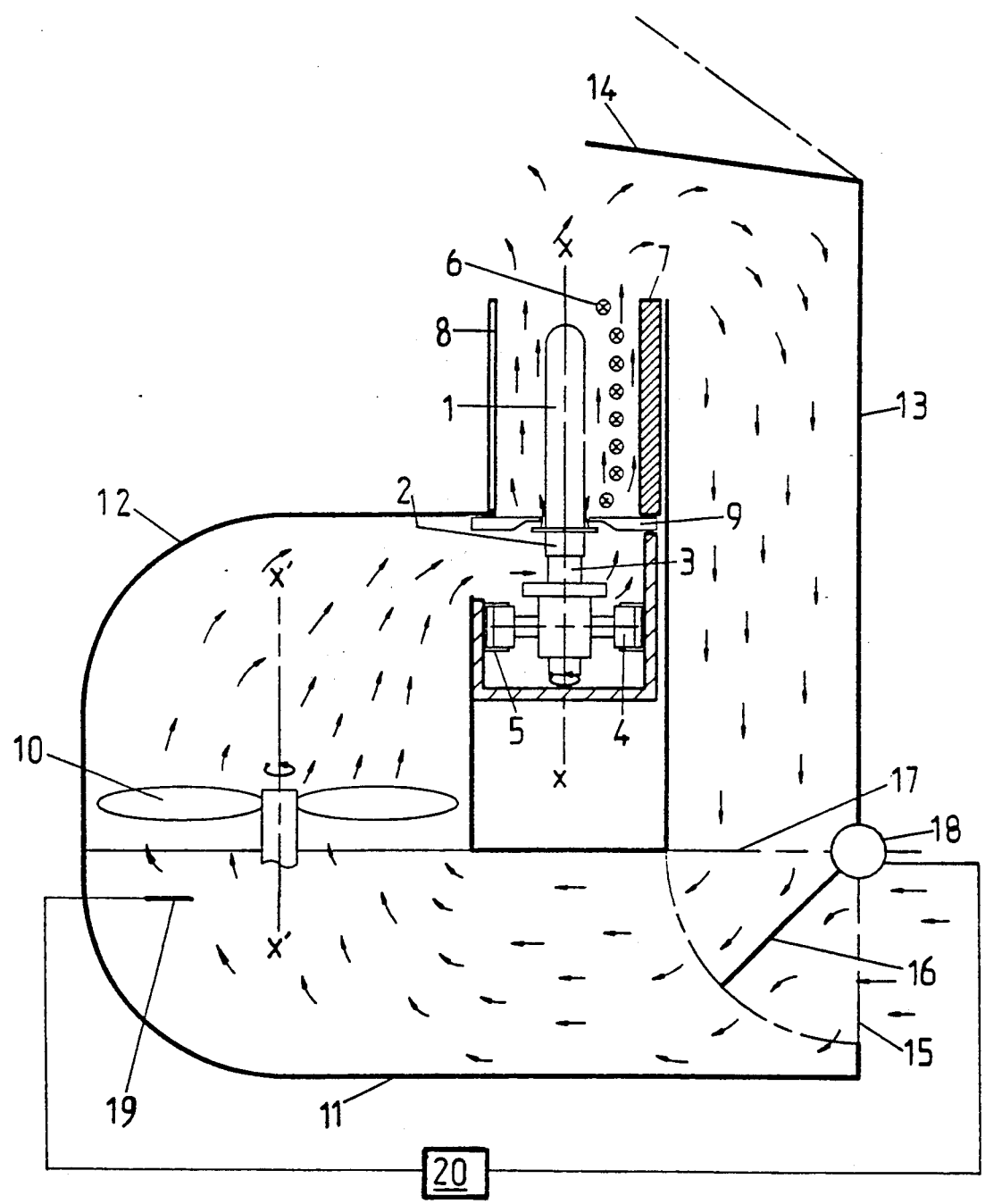
FIG. 1 is a transverse cross-section of an embodiment of a thermal preform-treatment oven according to the invention.

According to conventional technique, the preforms are heated in continuous-run ovens equipped with infrared radiation lamps arranged along the path followed by the preforms, which are, in addition, rotated around their longitudinal axes so as to be uniformly heated. The parts of the oven most exposed to the infrared radiation are cooled by a flow of air which evacuates the excess heat.

This process, as specified by the invention, for heating preforms made of thermoplastic materials in order to transform them subsequently into containers, such as bottles, flasks, or similar articles by blow molding or stretch blow molding is implemented in a thermal treatment oven as illustrated in FIG. 1.

Reference numeral 1 designates a preform(s) made of a plastic material, in particular PET and having a sealed end and an open end at the threaded neck 2. These preforms are produced conventionally, e.g., by molding or injection. They are positioned vertically on supports 3 which rotate around their vertical axes X—X, the sealed ends pointing upward.

The supports 3 ar guided laterally by rollers 4 engaged in horizontal, parallel runways 5, and travel into the oven perpendicular to the plane of the Figure. Heating elements 6, such as infrared radiation lamps, are positioned parallel to the path taken by the preforms 1. The number of these lamps depends on the length of the body of the preforms. In the embodiment illustrated, there are eight lamps. Panels 7 made of an insulation material are placed behind the heating elements. Set opposite the panels are reflectors 8 formed, for example, by metal plates whose sides facing the heating elements are polished. The heating elements 6, the panels 7 made of an insulation material, and the reflectors 8 are parallel.

Water-cooled protectors 9 are positioned perpendicular to the lower ends of the insulation panels 7 and the reflectors 8. They are separated from each other so as to allow, with slight play, the passage of the preform bodies. These protectors prevent the necks 2 from being heated by the infrared radiation emitted by the heating elements 6. In fact, the necks, which have already been molded to their final shape and dimensions, must not be significantly heated in order to prevent any undesirable deformation.

The insulation panels 7, the reflectors 8, and the protectors 9 thus form a passageway open at the top and having a slot in its bottom part, delimited by the protectors 9. The preform bodies, which project into the passageway through this slot, travel in front of the heating elements 6 while turning around their axes X—X, so as to ensure uniform heating.

A fan 10 turning around a vertical axis X'—X' draws in air through an air intake or duct 11 and drives it upwards through a guide deflector 12 such that the air circulates in an ascending flow into the passageway delimited by the panels 7, the reflectors 8, and the protectors 9. As a function of the length of the thermal treatment oven, one or several fans can be installed.

A plenum box 12 extends over the length of the thermal treatment oven and is laterally mounted thereon. At its top, it is fitted with a panel 14 which is pivotable around an axis perpendicular to the drawing, as indicated by the chain line. In its lower portion, the box 13 is connected by one of its faces to the air intake 11 of the fan. An opening 15 facing the air intake is formed on the opposite face of the box. A shutter 16 pivotable around a horizontal axis and driven by a motor 18 can seal the opening 15 partially or completely. The amplitude of the pivoting motion of the shutter is such that, in its end positions, it can seal either the opening 15 or an opening 17 located in the lower part of the plenum box and extending over its entire length. It may, moreover, occupy all intermediate positions between the end positions, as shown in FIG. 1. It is evident that, when several fans are installed, there are as many air intakes 11 and openings 15 as there are fans.

A temperature sensing probe 19 is mounted in the air intake of the fan, within the flow of suctioned air, and is connected to a regulation device 20 which controls the pivoting action of the shutter 16 in one direction or another, by means of the motor 18.

In operation, the preforms 1 to be heated are placed on the rotating supports 3 and travel while turning on their axes in front of infrared radiation heating elements 6. The fan 10 draws in a mixture of hot air and air at ambient temperature. The hot air is the air that has circulated in ascending flow in the passageway delimited by the panels 7 and the reflectors 8 and which has been heated by evacuating the excess heat generated by the infrared radiation on the components of the thermal treatment oven. This air is recycled partially or completely through the plenum box 13, and exits through the opening 17. The air at ambient temperature is drawn from the shop where the thermal treatment oven and the associated blow molding or stretch blow molding machine are installed. The pivoting shutter 16 makes it possible to adjust the proportions of recycled hot air and air at ambient temperature in the flow of air drawn in by the fan 10.

A reference temperature Tc is instructed into and/or established by the regulation device 20. The temperature Ts of the air drawn in by the fan and sensed by the probe 19 is continuously compared to the reference temperature Tc. If Ts is greater than Tc, the shutter 16 is moved angularly to reduce the flow of recycled hot air and to increase the flow of the air at ambient temperature. If Ts is less than Tc, the shutter 16 is moved angularly to increase the flow of recycled hot air and reduce the flow of the air at ambient temperature. When Ts =Tc, the shutter 16 maintains its position.

The pivoting panel 14 can also be shifted angularly to regulate the proportion of recycled hot air. In the position shown in solid lines in FIG. 1, most of the hot air will be recycled, while, in the position indicated by the chain line, only a small portion of this air will be recycled.

The advantages offered by the invention include the following:

Whatever the ambient temmperature prevailing in the shop, the temperature of the air forced upward by the fan remains constant. Accordingly, the preform heating conditions remain constant and it is not necessary to adjust the power of the infrared radiation heating elements 6 as a function of ambient temperature in the shop, which may vary significantly during the course of one day, as shown by the experimental temperature curve in FIG. 2. On this curve, hours are shown along the abscissa, and the ambient temperature recorded at the opening 15 is shown on the ordinate. It is apparent that, between 8:00 am and 7:00 pm, the ambient temperature in the shop varied by 11° C., rising from 26° C. to 37° C. In this case, by setting the reference temperature at 37° C. and, because of the device according to the invention, it will not be necessary to adjust the power of the heating elements 6 during the day.

In the winter, the start-up of the manufacture of hollow bodies at the beginning of the week in a shop which has not been heated during non-work days at the end of the preceding week, occurs under favorable conditions, without having to modify or adjust the infrared emitting sources. At the start of the day, the air drawn in by the fan will be made up, for the most part, by hot air recycled through the box 13. As the ambient temperature of the shop rises, the proportion of recycled hot air will decrease. The temperature of the flow of air driven upward by the fan will thus be constant.

Adjustments of the power of the infrared heating elements, which allow preform heating producing blown hollow bodies whose thickness distribution proves satisfactory, may be made in the factory, prior to delivery of the machine and based on the spot where it will be installed. In fact, if the machine is to be installed in a shop whose maximum temperature reached during the year is, for example, 30° C., the reference temperature Tc will be set at 30° C. and the adjustment of the heating elements will be made under these conditions. Accordingly, the machine will immediately be ready for production as soon as its installation in the workshop is completed.

A high degree of uniformity will be obtained in the production of hollow bodies molded from heated preforms. In fact, the thermal treatment of the preforms is made precise, repeatable, and independent of the ambient temperature of the shop in which the thermal treatment oven and the associated blow molding or stretch blow molding machine are installed.

The adjustment of the temperature of the air fed into the thermal treatment oven is obtained using a single energy source, i.e., the heated air which has cooled the oven components. To ensure this adjustment, it is only necessary that the reference temperature Tc be set equal to the maximum ambient temperature reached in the shop.

The reference temperature Tc can be set to the maximum value reached by the ambient temperature during the course of the day, the week, the month, or the year.

The temperature of the cooling air will remain constant despite an abrupt variation of the ambient temperature caused, for example, by opening a door, by a rain shower, a transient period of sunshine, etc.

I claim:

1. A process for the thermal treatment of preforms made of thermoplastic materials for the manufacture of hollow bodies by blow molding or stretch blow molding, comprising the steps of: rotating the preforms about axes thereof and simultaneously conveying the preforms in front of infrared radiation heating elements, directing a flow of cooling air over the preforms and heating elements to draw away excess heat generated by the infrared radiation, and maintaining the temperature of the flow of cooling air constant and equal to a reference temperature set in advance by mixing air at ambient temperature and heated air, said heated air being obtained by recycling the flow of cooling air which has become heated from evacuating the excess heat, and the reference temperature being maintained by varying the proportions of air at ambient temperature and of recycled heated air in the mixture.

2. A process according to claim 1, wherein the reference temperature is equal to the maximum value reached by the ambient temperature during a given time period.

3. A process according to claim 2, wherein the time period covers a range of from one day to one year.

4. A process for the thermal treatment of preforms made of thermoplastic materials for the manufacture of hollow bodies by blow molding or stretch blow molding, comprising the steps of:
   a) conveying the preforms past infrared radiation heating means, and simultaneously therewith rotating the preforms about longitudinal axes thereof,
   b) directing a flow of cooling air over the heating means, said cooling air comprising a mixture of ambient temperature air and recycled cooling air heated by the heating means,
   c) establishing a reference temperature for the cooling air,
   d) sensing the actual temperature of the cooling air,
   e) comparing the actual and reference temperatures to determine a difference therebetween, and
   f) varying the proportions of ambient temperature air and recycled cooling air in accordance with said difference to maintain the actual cooling air temperature constant and equal to the reference temperature.

* * * * *